United States Patent [19]

Hein et al.

[11] Patent Number: 4,904,329

[45] Date of Patent: Feb. 27, 1990

[54] PROCESS FOR STRIPPING OFF AN ADHERED-ON COATING AND DEVICE FOR CARRYING OUT THE PROCESS

[75] Inventors: Josef T. Hein, Dortmund; Herbert Dittmar, Langenfeld, both of Fed. Rep. of Germany

[73] Assignee: Henkel Kommanditgesellschaft auf Aktien, Duesseldorf, Fed. Rep. of Germany

[21] Appl. No.: 249,919

[22] PCT Filed: Dec. 11, 1987

[86] PCT No.: PCT/EP87/00772

§ 371 Date: Aug. 19, 1988

§ 102(e) Date: Aug. 19, 1988

[87] PCT Pub. No.: WO88/04617

PCT Pub. Date: Jun. 30, 1988

[30] Foreign Application Priority Data

Dec. 19, 1986 [DE] Fed. Rep. of Germany ....... 3643446

[51] Int. Cl.[4] ............................................. B32B 31/18

[52] U.S. Cl. .................................... 156/344; 118/684; 156/155; 156/305; 156/584; 222/402.1; 239/98; 239/99

[58] Field of Search ............... 156/344, 584, 155, 305; 239/97, 98, 99; 222/402.1, 192; 118/684, 305

[56] References Cited

U.S. PATENT DOCUMENTS

| | | | |
|---|---|---|---|
| 3,698,976 | 3/1971 | Ake et al. | 156/155 X |
| 3,920,185 | 11/1975 | Kwok | 239/99 |
| 4,466,852 | 8/1989 | Beltz et al. | 156/344 |
| 4,798,646 | 1/1989 | Sumi | 156/344 X |

FOREIGN PATENT DOCUMENTS

| | | |
|---|---|---|
| 0200858 | 11/1986 | European Pat. Off. . |
| 2552611 | 5/1977 | Fed. Rep. of Germany . |
| 3333221 | 3/1984 | Fed. Rep. of Germany . |
| 8617622 | 10/1986 | Fed. Rep. of Germany . |
| 2018694 | 6/1970 | France . |
| 76557 | 6/1977 | Luxembourg . |

*Primary Examiner*—Robert A. Dawson
*Assistant Examiner*—James Engel, Jr.
*Attorney, Agent, or Firm*—Ernest G. Szoke; Wayne C. Jaeschke

[57] ABSTRACT

Heavy wall, ceiling and floor coverings with closed surfaces can be pulled or pushed off relatively easily if the material connecting the coating with the substrate in an adhesive joint can at least be loosened with the aid of a stripping fluid. In accordance with the invention, a stripping fluid is pressed in an air-free, pulse-like way with the aid of a needle nozzle (1) through the coating with a high pressure into the adhesive joint (FIG. 1).

9 Claims, 3 Drawing Sheets

Figure 1:
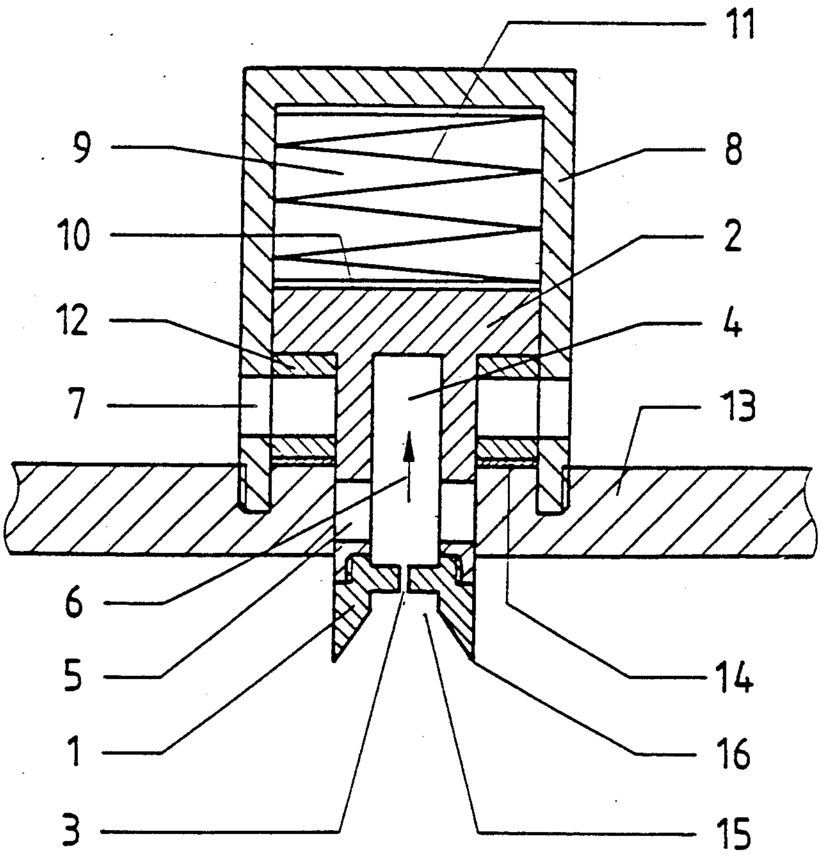

PROCESS FOR STRIPPING OFF AN ADHERED-ON COATING AND DEVICE FOR CARRYING OUT THE PROCESS

The invention pertains to a process for stripping off an adhered-on coating with a closed surface using a stripping fluid. It also pertains to a device for carrying out the process.

Adhered-on coatings with closed surfaces, such as wall, ceiling or floor coverings, especially when heavy, can be removed only with difficulty. The group of such coatings includes carpet-like wall coverings made of PVC foam plastic; PVC films with fabric backings; hessian cloth, jute and glass fiber fabric coated with silicate paints or dispersion paints or lacquers; rough fibers with several coats of dispersion paint covering; carpets protected with elephant skin, and foamed polystyrene cover plates. Such coatings can be removed by using steam jet devices; by planing off, with the aid of a putty knife, pushing away centimeter by centimeter; or by pretreating the coating with a nail roller and/or wetting with a carpet remover. In addition, exposed adhesive residues can be softened and pushed off by spreading with a dissolving agent.

It is also especially difficult to loosen adhered-on carpetings. New floors are removed by wetting and pulling out, by cutting into strips and pulling out the individual strips, or by superficial cutting or filing off and grinding away the residue. All of the loosening methods used in previous practice are very expensive in terms of work and time, and are linked with considerable soiling.

The invention is based on the task of creating a process and device which would make it possible to soften or predissolve the binding agent between the covering and the substrate, designated in the present connection merely as "adhesive" for the sake of simplicity, even in the case of a heavy coating with a closed surface to such a degree that the coating can be removed by pulling off or scraping off using a putty knife. The solution in accordance with the invention for the process of the initially mentioned type consists of the fact that the stripping fluid is forced through the coating in a pulse-like way, air-free, with the aid of a needle nozzle.

The invention means that the adhesive located in the adhesive joint between the coating and the substrate, prior to mechanical removal of the coating, is to be softened, loosened, or chemically decomosed, since the pure, air-free stripping liquid, under a pressure adequate to penetrate the coating, e.g., under 100 to 400 bar, is pressed directly into the adhesive joint. Piston or membrane pumps operated without air can be used for conveying the high pressure stripping liquid. The establishment of the penetration depth of the stripping liquid is thus accomplished by changing the pressure at the nozzle inlet. The process is particularly effective in the case of a stripping fluid that has been made slightly viscous, improving the lifting off of the coating from the substrate (wedge effect). Conventional stripping fluids such as methylene chloride or glycol alcohol are suitable for use in the present invention, for example. Also, in one embodiment, such stripping fluids are obtained from the manufacturer in a high viscosity form for use in the present invention.

In accordance with a further invention, a device for carrying out the process of the initially mentioned type, in which the stripping liquid is pressed in an air-free, pulse-like manner with the aid of a needle nozzle through the coating, consists of the fact that the needle nozzle has a nozzle opening to be connected in a valve-like way to the stripping fluid inlet by pressing against the coating to be removed, and that a pressure pump, delivering without air, is connected to the stripping fluid inlet.

In order to ensure that the stripping fluid, possibly present at the nozzle opening at a high pressure, can also be pressed through a dense and heavy coating, the nozzle opening is formed on its surface, intended to face the coating, as a half-shell, concave with respect to the coating. As a seal for the hollow shell, a cutter ring, an O-ring especially made of rubber, or a flat seal is used.

One handy embodiment of the device for pressing the stripping fluid into the adhesive gap between the coating and the substrate is produced if the nozzle is arranged at the end of a nozzle piston movable against spring force in a cylinder and having a cavity and if the piston cavity has connections to be brought into coincidence with the pressure feed line of the stripping fluid by pressing in the piston against the spring force. This nozzle piston should be accurately fitted, for example in a slotted cylinder, in order on one hand to accurately make the connection of the piston to the pressure line of the stripping fluid, and on the other hand to prevent forcing out of stripping fluid through the piston/cylinder seal.

By pressing such a device against the surface carrying the coating to be removed, the movable nozzle is pressed into the cylinder. The cross sections of the connection of the piston cavity with the pressure line of the stripping fluid opening into the cylinder come to coincide, and the stripping fluid shoots into the coating at high pressure. As a result, a counter-force is exerted on the device, which pushes the device away from the wall, so that the piston is pushed back out of the cylinder by the spring force acting on it, and thus the fluid feed is interrupted. The device is thus immediately ready for the next injection.

In the case of a device of the type in accordance with the invention to be operated by hand, two or more nozzles can also be arranged in a linear or superficial way on a carrier element. The carrier element is then advantageously formed as a hollow cylinder connected to the pressure line of the stripping fluid, which comes into connection with the nozzles in a pulse-like way by the pressing in of the nozzles, i.e., by pressing the device against the coating to be stripped. In any case the operator need only apply the force required to move the device and press in the nozzles (open the nozzles against a spring). On the other hand, the force required for pressing the stripping fluid into the adhesive gap is supplied by the high liquid pressure, and thus by the connected pump.

The carrier element, carrying one or more nozzles, can also be suspended from springs in a rolling box in the form of a large machine, wherein a mechanical system that periodically lowers the carrier element as the box is pushed forward, controlled or driven by the rollers, especially a cam mechanism, can be provided. The spring loading of the carrier element should be adjusted such that in the resting position it pulls up the carrier element into the roller box. The wheels can be coupled with the lowering mechanism of the carrier element in such a way that when the roller box is pushed forward a periodic lowering of the carrier element takes place in that the nozzles are pressed against the coating in a shock-like way. As a result of the ensuing pressing of the nozzles against the base, in each case an injection of stripping fluid is released.

Figure 2:
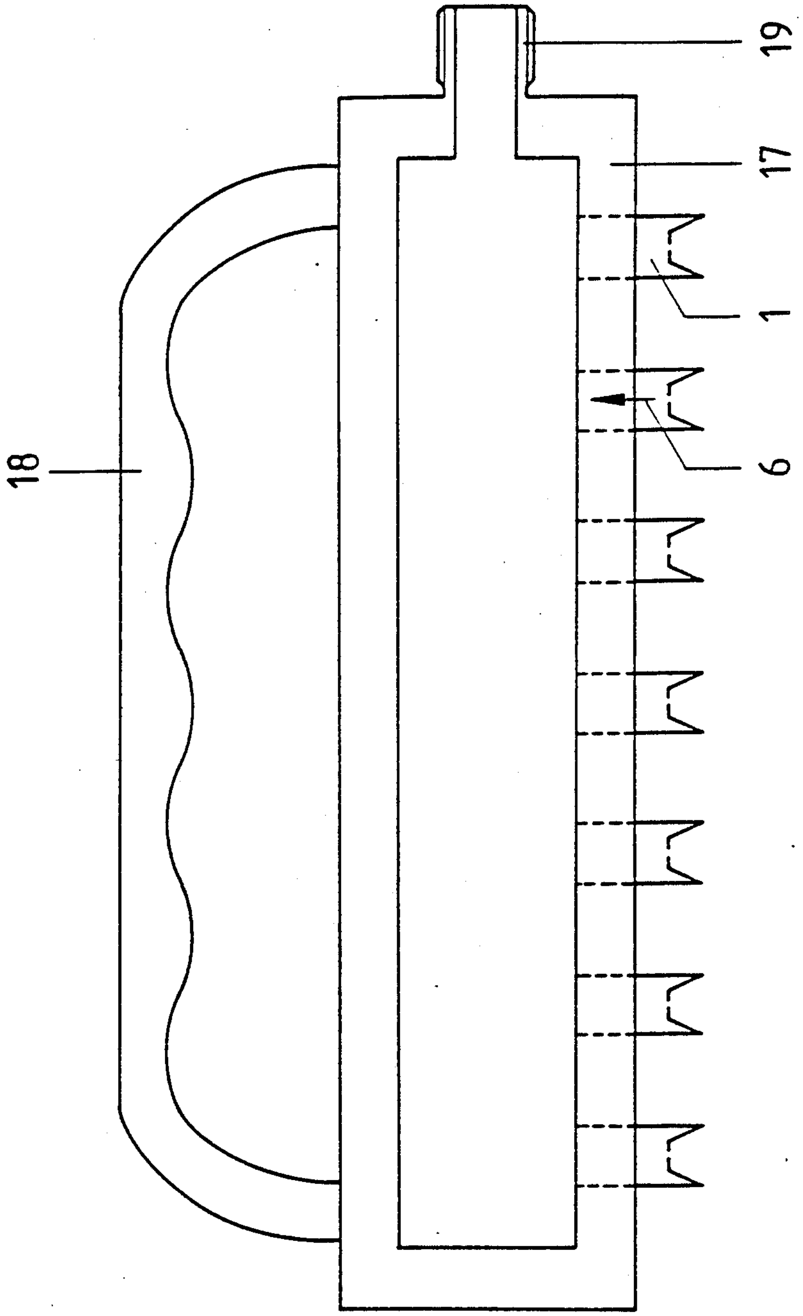
Figure 3:
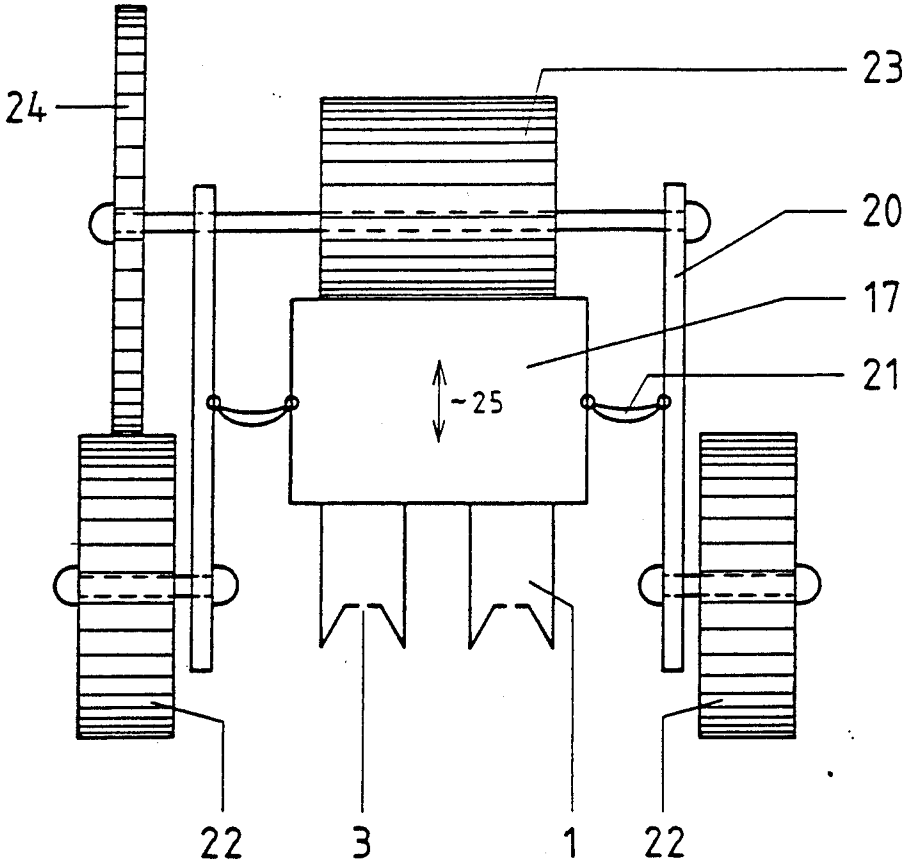

On the basis of the schematic representation of exemplified embodiments, details of the invention will be explained. These are as follows.:

FIG. 1, a theoretical diagram of the nozzle and its support;

FIG. 2, a section through an injection device for stripping liquid, to be guided by hand; and FIG. 3, a section through a device to be slid over the floor for pressing stripping liquid into the adhesive joint between a floor covering and the substrate.

The nozzle designated overall by 1 in FIG. 1 is designed as a movable hollow nozzle piston 2 with a cavity 4 leading to the nozzle opening 3. The cavity 4 has a transverse hole 5 which, upon moving the nozzle in the direction of the arrow 6, is to be brought into coincidence with a stripping fluid-transporting pressure line 7. A reliable guidance with elastic restoring force of the nozzle piston 2 is achieved when the piston 2 is guided with a close tolerance in a cylinder 8 with a spring 11 in it acting on the piston surface 10 facing the cylinder inner chamber 9. The sealing off of the line 7, under a pressure of 200 to 400 bar, for example, against the piston 2 or the cylinder inner chamber 9 becomes especially stable when the line 7 is introduced in the form of a closely fitting bushing 12 to the, e.g., cylindrical surface of the nozzle piston 2.

On the circumference of the nozzle piston 2, a seal 14 provided as a connecting piece 13 to a hand grip or the like is provided. This seal 14 is supposed to surround the body of the nozzle 1 in a close-fitting way. In addition, the underside of the nozzle 1 intended to face the coating respectively to be removed should be designed as a hollow shell 15 in order to ensure systematic pressing of the stripping fluid into the coating. As a seal for the hollow shell, in the exemplified embodiment a cutting ring 16 is provided, and an O-ring, e.g., made of rubber, or a surface seal may also take its place.

FIG. 2 shows a section through a manual device equipped with several nozzles 1. On a supporting element 17 of this device, displaying a hand grip 18, the nozzles 1 are arranged in a linear and/or superficial way. The supporting element 17 is designed as a hollow piece, and its cavity is provided with a connection 19 for a high pressure line of a pump supplying the stripping fluid.

By pressing the manual device according to FIG. 2 against the coating to be stripped off (on the floor, ceiling or wall), nozzles 1 movable in the direction of the arrow 6 are pressed into the supporting element 17. In this way, valves of the nozzle 1 are opened into the cavity of the supporting element 17, which is under pressure; e.g., the transverse holes 5 of the nozzles 1 and the feed lines 7 (according to FIG. 1) come to coincide, and then the stripping liquid, pressurized and conveyed without air, shoots into the coating that is to be loosened. This "shot" results in a back pressure on the device, which again moves the device (against the force of the operator) back away from the coating. As a result, once again the nozzle is pushed forward by the spring 11, the liquid supply is interrupted, and the device is ready for the next shot.

FIG. 3 shows a device, designed as a machine to be advanced along the floor, for loosening an adhered-on floor covering with the aid of a stripping fluid to be pressed in an air-free, pulsed way by needle nozzles into the adhesive joint between the coating and the substrate. In this process the entire supporting element 17 (see FIG. 2) is suspended in a spring-loaded way in a roller box 20, e.g., on symbolically illustrated leaf springs 21. The roller box 20 has rollers 22. On the underside of the supporting element 17 between rollers 22 there are nozzles 1 with vertically downward directed nozzle openings 3. Above the supporting element 17, a cam mechanism indicated by an eccentric 23 is provided, which is coupled over a friction wheel 24 directly with a roller 22 of the roller box 20. The weight of the roller box 20 can be predetermined by material selection. In the case of use in the floor area, the roller box can be made heavier using a water tank or the like.

In the resting position of the machine, indicated in FIG. 3, the springs 21 pull up the carrier element 17 to the roller box 20. However, when this machine is advanced over the coating that is to be loosened, the eccentric 23 coupled over the friction wheel 24 with one of the rollers 22 presses the supporting element 17 downward in the arrow direction 25, possibly supported by the spring expansion process. In this way the nozzles 1 are pressed onto the substrate, and the desired injection is initiated. Otherwise the pressing of the stripping fluid into the adhesive joint between the coating to be stripped and the substrate theoretically takes place as in the case of the manual device according to FIG. 2.

We claim:

1. A process for removing the coating from a composite comprising a coating, a substrate and an adhesive therebetween comprising injecting pulses of substantially air-free stripping fluid under pressure and through a needle nozzle zone into the adhesive to soften or decompose the adhesive, prior to attempting removal of said coating and thereafter removing said coating from the substrate.

2. The process of claim 1 wherein the stripping fluid is made to have a high viscosity before pressing into the adhesive joint.

3. Device for injecting pulses of stripping fluid under pressure into an adhesive between a coating and substrate which comprises a needle nozzle having a nozzle opening removably joinable to a pressure line for the stripping fluid by pressing said needle nozzle against the coating to be removed, and said pressure line being connected to a pressure pump.

4. Device in accordance with claim 3 wherein said pressure pump is selected from a membrane or piston pump.

5. Device in accordance with claim 3 wherein said nozzle opening is surrounded by a half-shell that is concave with respect to the coating.

6. Device in accordance with claim 5 wherein said nozzle opening is surrounded by a surface seal.

7. Device in accordance with claim 3 wherein the needle nozzle is located at the end of a nozzle piston guided movably in a cylinder, said nozzle piston mounted against a spring force and having a hollow chamber containing a transverse hole which is removably joinable to said pressure line for the stripping fluid by pushing the nozzle piston in against said spring force.

8. Device in accordance with claim 3 wherein at least two needle nozzles are arranged in a linear way on a supporting element which comprises a hollow body connected to a pressure line for the stripping fluid.

9. Device in accordance with claim 8, wherein the supporting element is suspended in a spring-supported way in a roller box, in combination with means for periodically lowering the supporting element upon the advance of the box.

* * * * *